United States Patent [19]
Kreuzer

[11] 3,820,901
[45] June 28, 1974

[54] MEASUREMENT OF CONCENTRATIONS OF COMPONENTS OF A GASEOUS MIXTURE

[75] Inventor: Lloyd Barton Kreuzer, San Diego, Calif.

[73] Assignee: Bell Telephone Laboratories, Incorporated, Murray Hill, Berkeley Heights, N.J.

[22] Filed: Mar. 6, 1973

[21] Appl. No.: 338,537

[52] U.S. Cl.................. 356/97, 250/345, 356/204, 356/206
[51] Int. Cl........................ G01j 3/42, G01m 21/22
[58] Field of Search......... 356/51, 74, 97, 201, 204, 356/206; 250/343, 345

[56] References Cited
UNITED STATES PATENTS

| | | | |
|---|---|---|---|
| 3,588,496 | 6/1971 | Snowman............................. | 356/51 |
| 3,632,212 | 1/1972 | Bernal.................................. | 356/51 |
| 3,728,540 | 4/1973 | Todd et al. ......................... | 356/51 |

OTHER PUBLICATIONS

Journal of Applied Physics; Vol. 42, No. 7, pg. 2,934–2,943, June, 1971.

Manual on...Spectrophotometry; ASTM; 2nd Edition; Dec. 1966; pgs. 40–50.

*Primary Examiner*—Vincent P. McGraw
*Attorney, Agent, or Firm*—A. J. Torsiglieri; D. I. Caplan

[57] ABSTRACT

A technique for measuring the concentrations of each of the gases in a mixture of known gases. A laser source is first used to transmit monochromatic radiation at a number of wavelengths in turn through a known concentration of each of the gases expected in the mixture of gases separately and there is derived the absorption coefficients of each of these gases at each of these wavelengths. Thereafter, by measuring the absorption of the unknown mixture at these same wavelengths and by use of the derived absorption coefficients, there can be derived the concentrations of each of the gases in the mixture. By making measurements at more wavelengths than the number of known gases in the mixture, there can be provided warning as to the presence of unknown gases in the mixture.

4 Claims, 1 Drawing Figure

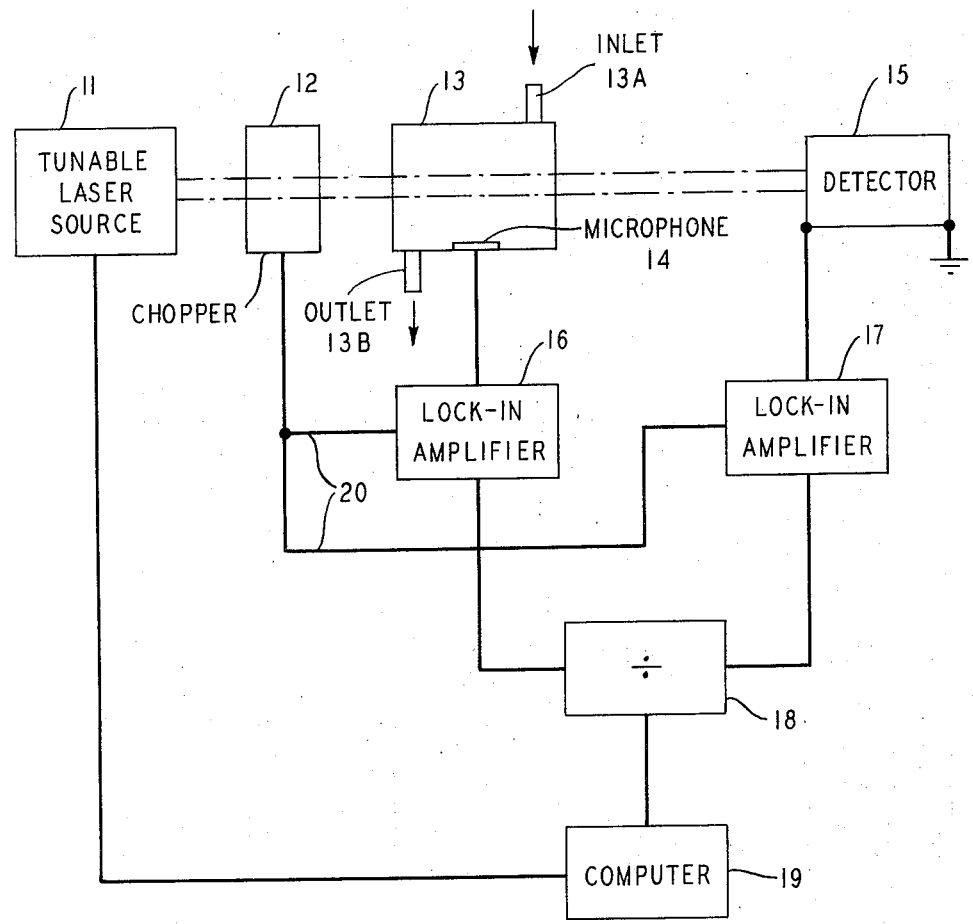

MEASUREMENT OF CONCENTRATIONS OF COMPONENTS OF A GASEOUS MIXTURE

BACKGROUND OF THE INVENTION

1. Field of the Invention

This relates to the measurement of the concentration of specific gaseous components in a gaseous mixture.

2. Background of the Invention

Presently, there is considerable interest in the quantitative measurement of specific minor components in a gaseous mixture and consequently a need has arisen for techniques for performing such measurements conveniently and reliably.

In particular, such need may arise in monitoring the amounts of particular impurities in an industrial environment to insure that such impurities are not present in excessive amounts. Alternatively, such need may arise in monitoring the amounts of particular pollutants in industrial stacks or even auto exhausts.

Among the various approaches to these problems currently, is one which employs a laser as a source of radiation, a cell in which a sample of the mixture being evaluated is housed and through which the radiation is transmitted, and apparatus for measuring the absorption of the radiation by the cell. A particular promising technique of this general kind is described in my paper, published in the *Journal of Applied Physics*, Vol. 42, No. 7, pages 2,934–2,943 (June, 1971), which makes use of the optoacoustic effect in measuring the absorption of the applied radiation in the cell housing the sample. This permits the measurement of the absorption directly rather than as a measurement of the difference between the power into and out of the cell as is characteristic of the usual form of spectrometer. As a consequence, this approach is capable of higher accuracy than the usual form.

This technique originally was devised to permit measurement of the concentration of a single gas specie, the frequency of the radiation being chosen to correspond to the frequency of a peak in the absorption spectrum of the specie being measured. This technique, however, becomes unreliable if there are present in the sample unknown amounts of other gases which absorb radiation of the frequency being used. Moreover, in the cases of greater practical interest, there will be present in the sample unknown amounts of several gases with overlapping absorption spectra.

I have found that if the concentrations of each of the different gases are not excessively disparate, it is possible, by appropriate measurements in accordance with my invention to determine with reasonable accuracy the concentration of each of a plurality of known gases in the mixture and to be alerted to the presence in the mixture of another gas whose absorption spectrum overlaps that of the known gases sufficiently to interfere seriously with the accuracy of the measurements of the desired concentrations.

Moreover, it is possible in accordance with my invention, to identify many pollutants with essentially only a single system which can be made essentially automatic once appropriate calibration has been performed.

SUMMARY OF THE INVENTION

In accordance with the present invention, to measure the various concentrations of different gas species in a gaseous mixture, there is employed a laser source capable of providing radiation at at least a corresponding number of different wavelengths, each advantageously chosen, to the extent feasible, to be strongly absorbed by only one of the gases to be measured. Radiation at each of these wavelengths singly in turn is then transmitted through a cell housing a known concentration of one of the gases expected in the unknown mixture later to be analyzed and the amount of absorption at each of these wavelengths measured. This is repeated for each gas. In the preferred embodiment of the invention, at least one additional measurement is made for each gas at a still different wavelength to provide an additional parameter for reasons to be discussed later.

Thereafter, a cell including a sample of the gas mixture to be analyzed is similarly subjected in turn to radiation at each of the wavelengths used earlier and an absorption measurement is made at each of these wavelengths. From these measurements, properly weighted in accordance with the values previously obtained from the measurements of the known mixture, there can be readily derived the concentrations of the various specified gases in the unknown mixture. It should be recognized that there is needed merely the measurements at the same number of wavelengths as there are gases of interest in the mixture. However, the use of the measurement at an additional wavelength permits a check on the presence in the mixture of additional gases having an overlapping absorption spectrum as will be discussed more fully later.

In a particular embodiment of the invention, the laser is a tuneable carbon dioxide laser capable of providing essentially monochromatic radiation at each of a number of wavelengths in the infra-red range and the emitted radiation is transmitted through a cell which contains both a sample of the gas being analyzed and a detector sensitive to changes in the gas pressure in the cell.

Advantageously, to make the system essentially independent of the output level of the laser source, there is also measured the level of the radiation passing out of the cell and this measure is used to compensate for any changes in the output level.

Moreover, to minimize the influence of noise in the system, the laser beam is amplitude modulated and the measuring system involves a synchronous detector.

DRAWING DESCRIPTION

The invention will be better understood from the following more detailed description of the drawing which shows, partially in block schematic form, a measuring system suitable for the practice of the invention.

DETAILED DESCRIPTION

With reference now to the drawing, a source 11, capable of providing the radiation at wavelengths appropriate for the gases to be analyzed, emits such radiation continuously and such radiation is made discontinuous by the action of chopper 12. In the embodiment to be described specifically, the source 11 is a carbon dioxide laser which is tuneable to a number of separate wavelengths including 9.25, 10.16, 10.33, 10.57, 10.72 and 9.55 micrometers and the action of chopper 12 is to produce a pulse train having a repetition rate of about 25 Hertz with a duty cycle of about one-half. This series of wavelengths is particularly useful for analyzing a mixture consisting essentially of ethanol, methanol, ammonia, trichloroethylene and air, in which the concentrations of the first four mentioned gases are to be measured.

The radiation is directed through a cell 13 housing a sample of the gas mixture to be analyzed. The cell is provided with an inlet 13A and an outlet 13B by means of which successive samples can first be introduced, held long enough to be analyzed and subsequently removed.

In a specific embodiment the cell was essentially cylindrical with a length of 15 cms. and a diameter of 2.5 cms. and aligned to have the radiation pass along the axis of the cell. In a side wall of the cell, there is located a pressure-sensitive element 14, such as an electret foil condenser microphone, capable of detecting pressure changes resulting from heating of one or more of the gases in the cell as a result of absorption of the radiation passing through the cell. As mentioned earlier, the use of a detector in this fashion is described in my aforementioned paper. At the exit end of the cell, there is additionally provided a light sensitive element 15 to provide a measure of the level of the radiation exiting from the cell. Because the amount of radiation absorbed at any time in the cell is typically only a small fraction of the total emitted by the laser, the amount exiting from the cell is still a relatively good approximation of the original laser level and can be used to compensate for any changes in such level. Of course, if the level of the emitted radiation is made constant by suitable expedients, it becomes unnecessary to make provision for compensation against changes in such levels.

The signal detected by element 15 can be used to compensate for changes in the input radiation in the signal detected by element 14 in any suitable fashion. As shown, after amplification and detection of each of these signals in amplifiers 16 and 17, respectively, the amplified signals are applied to a divider 18 which provides an output which is essentially a measure of the signal detected by element 14 divided by that detected by element 15 and so is a measure of the fraction of the total input radiation which is absorbed in cell 13. Alternatively, the signal measured by element 15 may be used to control the amplification of the signal measured by element 14 to compensate for changes in laser level.

To minimize the influence of noise and other extraneous effects on the measurements, it is advantageous to use lock-in amplifiers 16 and 17 to provide synchronous detection. To this end, the action of chopper 12 and the gating of amplifiers 16 and 17 are synchronized as shown schematically by the lines 20. Ways of achieving the desired synchronism are familiar to a worker in the art and so will not be discussed in detail.

For the practice of the invention, the cell 13 is first filled successively with a known concentration of each of the gases to be analyzed. The accuracy of the system is enhanced when each of the various wavelengths of the radiation to be used is strongly absorbed by one and only one gas in the mixture.

Then the laser is adjusted to provide radiation at a desired single wavelength for passage through the cell and the fraction absorbed in the cell at such wavelength is measured as the output of the divider 18. This procedure is repeated at each of a number of different prescribed wavelengths, the number advantageously being at least one greater than the number of different gases in the sample, whose concentrations are to be measured. As mentioned as advantageous above, the wavelengths are chosen to the extent feasible so that there is at least one strongly absorbed at each of the different gases to be analyzed. In the system being described by way of example, the wavelengths were at 9.25, 10.16, 10.33, 10.57, 10.72, and 9.55 micrometers, although the concentrations of only four gases in the mixture were being measured, the last two measurements being used for the consistency check.

Moreover, advantageously, the radiation emitted at each of the wavelengths is in the range of between 100 and 500 milliwatts to permit convenient measurement of the absorption experienced in passage through the cell.

I have found that in the range of 0.001PPM to 10,000PPM, ordinarily it is feasible to treat the absorption processes of the different gases as essentially linear. As a result, the total absorption measured at each of the wavelengths can be treated as the linear sum of the absorptions by each of the gases in the mixture.

Mathematically, this can be described by the matrix as follows:

$$A_i = \sum_{g=1}^{n} C_g a_{gi}$$

where
$A_i$ is the total absorption of the mixture at a particular wavelength $\lambda_i$;
$a_{gi}$ is the absorption coefficient of a particular gas $g$ at wavelength $\lambda_i$ for a unit concentration of the gas;

$n$ is the number of gases in the mixture; and
$C_g$ is the number of concentration units of a particular gas in the mixture.

By setting up and solving the simultaneous linear equations that are formed by the measured absorption at each of the wavelengths for known concentrations of each of the gases there can be derived the various absorption coefficients.

There is shown below in Appendix 1 the absorption matrix $a_{gi}$ for the exemplary mixture of gases discussed above at the wavelengths shown and in Appendix 2 the inverse matrix $a_{ig}^{-1}$ corresponding thereto.

These initial measurements typically are done in a laboratory under controlled conditions but the absorption coefficients thereby derived will now have general applicability so long as the same wavelengths are employed and a gas mixture to be analyzed does not include a significant amount of any additional gas which exhibits appreciable absorption at any of these wavelengths.

Once these absorption coefficients have been derived, there can be simply derived in straightforward fashion the inverse matrix $a_{ig}^{-1}$ of the absorption matrix and this can be used to derive the concentrations of the various gases from the following relationships:

$$C_g = \sum_{i=1}^{n} A_i a_{ig}^{-1}$$

Accordingly, to determine the concentrations of the different gases in a sample which is a mixture of the same gases as in the original tests, there is simply measured the absorption of the mixture at each of the various wavelengths used before and these measured values simply used to derive the values of the various concentrations. The necessary calculations are readily done in a minicomputer 19 as shown schematically in the drawing. Alternatively, if a large number of analyses were to be done on mixtures involving the same set of gases, a special purpose computer could be readily designed for use exclusively for such calculations.

The measurement of absorption for a known concentration of each gas at one or more extra wavelengths permits the derivation of absorption coefficients at these additional wavelengths in the same fashion as used for the other wavelengths. These normally would be redundant. However, their availability makes it possible to check on the presence in the mixture being analyzed of foreign gases which absorb at such extra wavelengths. In particular, the presence of such a gas would result in the derivation of values for the concentrations of the desired gases inconsistent with the other derivations and a user would be warned that all the values derived were consequently suspect.

An important characteristic of the system described is that the measurement of the concentration of the various gases in a mixture of the kind discussed can be made essentially automatic once there has been derived the appropriate values of the inverse matrix transpose appropriate to the mixture of gases and to the wavelengths of radiation involved. In particular, it is feasible to provide an arrangement in which the laser source steps automatically in turn to the desired different wavelengths and in which the currents provided by the divider are translated into numerical values for application to an appropriately programmed computer which provides a print-out of the values of the various concentrations of the mixture.

APPENDIX 1

Absorption Matrix $a_{it}$

|  | $9.25\mu$ | $10.16\mu$ | $10.33\mu$ | $10.57\mu$ |
|---|---|---|---|---|
| Ethanol | 0.00126 | $7.826^{-5}$ | $4.158^{-5}$ | $3.315^{-5}$ |
| Methanol | $1.523^{-4}$ | $8.845^{-4}$ | $1.037^{-4}$ | $4.723^{-5}$ |
| Ammonia | $1.507^{-5}$ | $1.184^{-5}$ | 0.006065 | $3.775^{-5}$ |
| Trichloroethylene | $263^{-4}$ | $5.97^{-5}$ | 0.005546 | $2.307^{-5}$ |

APPENDIX 2

Inverse Matrix $a_{it}^{-1}$

|  | Ethanol | Methanol | Ammonia | Trichloroethylene |
|---|---|---|---|---|
| $9.25\mu$ | 802.28 | −70.331 | −4.25663 | −4.16752 |
| $10.16\mu$ | −137.931 | 1144.29 | −18.533 | −8.79423 |
| $10.33\mu$ | −1.72309 | −1.89886 | 164.935 | −1.0962 |
| $10.57\mu$ | −0.177609 | −25.7461 | −1.33569 | 180.54 |

What is claimed is:

1. A process for measuring the concentration of each of a first plurality of known gases in a mixture comprising the steps of passing individually through a known concentration of each of the gases monochromatic radiation, which is modulated in intensity at a predetermined rate, at each of a second plurality of wavelengths;

measuring the fraction of the radiation absorbed at each wavelength by each gas in passing therethrough and deriving the absorption coefficient for each gas at each wavelength;

passing monochromatic radiation which is modulated in intensity at a predetermined rate at each of said wavelengths through the mixture of gases whose concentrations are to be measured;

measuring the fraction of the radiation absorbed at each wavelength in passing through the mixture by developing a first signal output at each wavelength from a pressure-sensitive element responsive to the pressure changes in the mixture, said pressure changes caused by the resulting time-varying absorption of portions of the radiation at the predetermined rate, a second signal output from a light-sensitive element responsive to the level of the monochromatic radiation at each wavelength incident on the mixture, and a third signal proportional to the ratio of the first signal to the second signal; and deriving the concentrations of each of the gases in the mixtures from said third signal measurements and the previously derived absorption coefficients.

2. The process of claim 1 in which the first plurality is smaller than the second plurality and in which the excess values are used to provide a consistency check for the presence of additional gases in the mixture.

3. Apparatus for measuring the concentrations of each of a plurality of gases in a mixture comprising means for providing monochromatic radiation which is modulated in intensity at a predetermined rate separately at each of a plurality of wavelengths;

means positioned in the path of the monochromatic radiation for enclosing a sample of the gas to be analyzed;

pressure-sensitive means for developing first signals responsive to the pressure changes in the mixture for developing a first signal proportional to said pressure changes, said pressure changes caused by the resulting time-varying absorption of portions of the radiation at the predetermined rate;

light-sensitive means responsive to the levels of radiation incident on the mixture for developing second signals proportional to said levels;

means for producing third signals proportional to the ratios of each of the first signals to the corresponding second signals;

means for periodically interrupting in synchronism the passage of the monochromatic radiation through the enclosing means and the development of said third signals such that the third signals are developed only during the passage of radiation through the enclosing means; and means for deriving from said third signals a value of the concentrations of each gas in the mixture.

4. Apparatus in accordance with claim 3 further characterized in that the last-mentioned means includes means for controlling the wavelength of the radiation providing means.

* * * * *

UNITED STATES PATENT OFFICE
CERTIFICATE OF CORRECTION

Patent No. 3,820,901  Dated June 28, 1974

Inventor(s) Lloyd Barton Kreuzer

It is certified that error appears in the above-identified patent and that said Letters Patent are hereby corrected as shown below:

Column 5, lines 37-44 (APPENDIX 1), should appear as shown below:

APPENDIX 1

Absorption Matrix $a_{gi}$

|  | $9.25\mu$ | $10.16\mu$ | $10.33\mu$ | $10.57\mu$ |
|---|---|---|---|---|
| Ethanol | .00126 | $7.826 \times 10^{-5}$ | $4.158 \times 10^{-5}$ | $3.315 \times 10^{-5}$ |
| Methanol | $1.523 \times 10^{-4}$ | $8.845 \times 10^{-4}$ | $1.037 \times 10^{-4}$ | $4.723 \times 10^{-5}$ |
| Ammonia | $1.507 \times 10^{-5}$ | $1.184 \times 10^{-5}$ | .006065 | $3.775 \times 10^{-5}$ |
| Trichloro-ethylene | $2.307 \times 10^{-5}$ | $1.263 \times 10^{-4}$ | $5.97 \times 10^{-5}$ | .005546 |

Signed and sealed this 3rd day of December 1974.

(SEAL)
Attest:

McCOY M. GIBSON JR.
Attesting Officer

C. MARSHALL DANN
Commissioner of Patents